(12) United States Patent
Tozzi et al.

(10) Patent No.: US 7,659,655 B2
(45) Date of Patent: Feb. 9, 2010

(54) PRE-CHAMBER SPARK PLUG

(75) Inventors: Luigi P. Tozzi, Fort Collins, CO (US); Douglas W. Salter, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 527 days.

(21) Appl. No.: 10/547,623

(22) PCT Filed: Jun. 7, 2005

(86) PCT No.: PCT/US2005/020121

§ 371 (c)(1),
(2), (4) Date: Aug. 30, 2005

(87) PCT Pub. No.: WO2006/011950

PCT Pub. Date: Feb. 2, 2006

(65) Prior Publication Data

US 2007/0069617 A1     Mar. 29, 2007

Related U.S. Application Data

(60) Provisional application No. 60/582,567, filed on Jun. 24, 2004.

(51) Int. Cl.
*F02B 19/16*     (2006.01)
*F02B 19/00*     (2006.01)
*H01T 13/20*     (2006.01)

(52) U.S. Cl. .................. 313/143; 123/285; 123/266

(58) Field of Classification Search .......... 313/118, 313/123, 143; 123/143, 169 R, 169 EL, 169 MG, 123/260, 266, 280, 285; 445/7
See application file for complete search history.

(56) References Cited

U.S. PATENT DOCUMENTS

| 1,538,750 | A |   | 5/1925 | Scognamillo |
|-----------|---|---|--------|-------------|
| 2,047,575 | A | * | 7/1936 | Burtnett ................. 313/143 |
| 2,208,030 | A | * | 7/1940 | Holmes .................. 313/157 |

(Continued)

FOREIGN PATENT DOCUMENTS

CN     2825995 Y     10/2006

OTHER PUBLICATIONS

U.S. Appl. No. 10/806,525, filed Sep. 29, 2005, Boley et al.

*Primary Examiner*—Peter J Macchiarolo
(74) *Attorney, Agent, or Firm*—Reinhart Boerner Van Deuren P.C.

(57) ABSTRACT

A method and apparatus to maximize spark plug life in prechamber spark plugs operating with ultra-lean mixtures and/or elevated engine BMEP is presented. Electrode erosion is reduced by spreading discharge energy over a wider surface area, maintaining fuel concentration in the spark gap, controlling gas static pressure during discharge, and maintaining safe electrode temperature. Energy is spread via a swirling effect created by periphery holes in an end cap, resulting in a lower specific energy discharge at the electrodes. Divergently configured electrodes reduce the spark voltage at high operating pressures and the energy required for ignition. The flow field generated at the electrodes prevents electrical shorts due to water condensation and avoids misfire. The center electrode insulation provides an effective heat transfer path to prevent electrode overheating and preignition. The volume behind the electrodes provides a volume for burnt products from previous combustion cycles and leads to more reliable ignition.

25 Claims, 11 Drawing Sheets

U.S. PATENT DOCUMENTS

| | | | |
|---|---|---|---|
| 2,843,780 A * | 7/1958 | Harper .................. 313/143 |
| 4,795,937 A | 1/1989 | Wagner et al. |
| 4,901,688 A | 2/1990 | Kashiwara et al. |
| 4,963,784 A | 10/1990 | Niessner |
| 5,554,908 A | 9/1996 | Kuhnert et al. |
| 5,555,862 A * | 9/1996 | Tozzi .................. 123/143 B |
| 5,619,959 A | 4/1997 | Tozzi |
| 5,947,076 A | 9/1999 | Srinivasan et al. |
| 6,064,144 A | 5/2000 | Knoll et al. |
| 6,198,209 B1 | 3/2001 | Baldwin et al. |
| 6,460,506 B1 * | 10/2002 | Nevinger .................. 123/260 |
| 2002/0180326 A1 | 12/2002 | Francesconi et al. |
| 2005/0211217 A1 * | 9/2005 | Boley et al. .................. 123/266 |
| 2007/0236122 A1 * | 10/2007 | Borror .................. 313/118 |

* cited by examiner

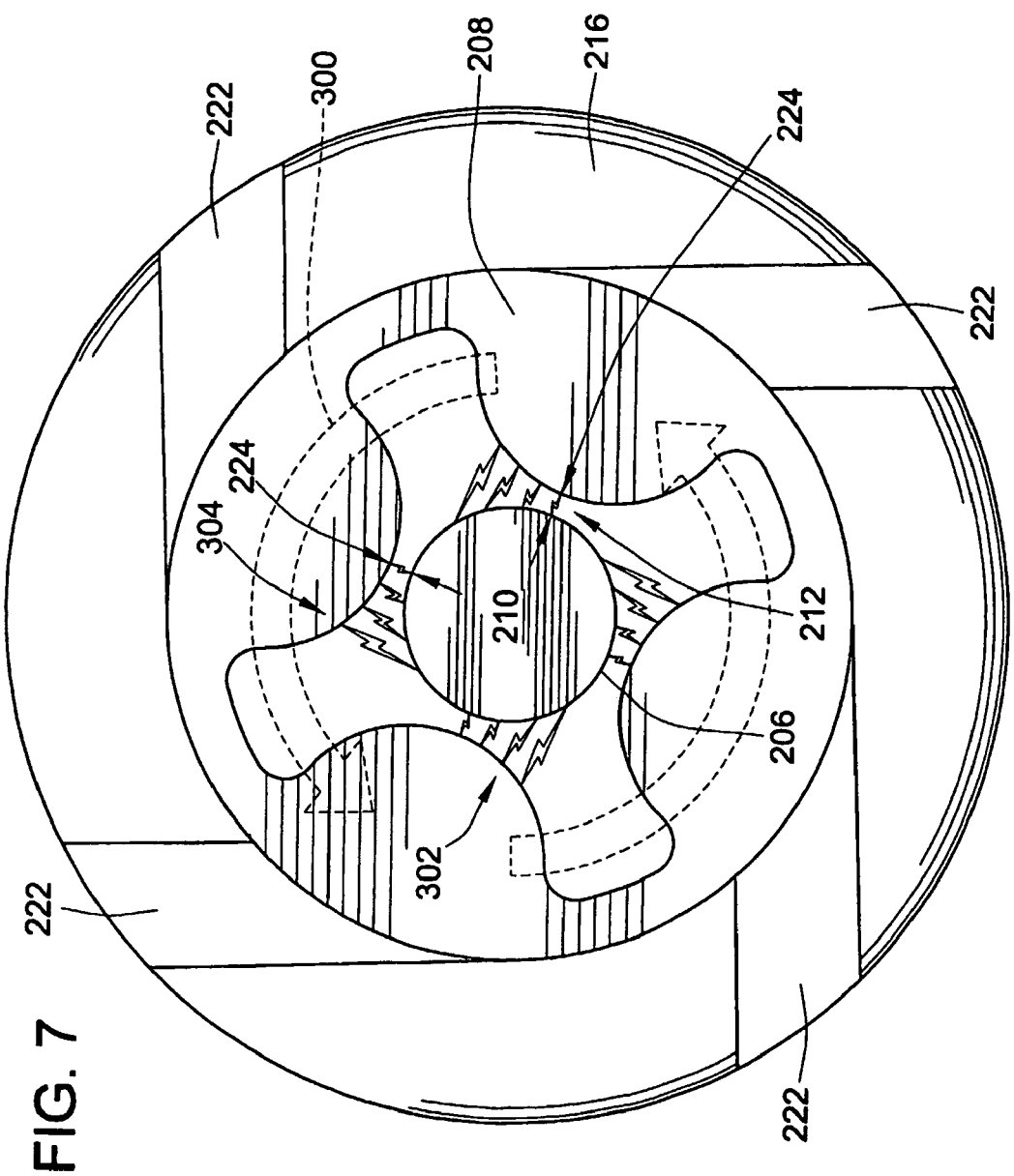

PRE-CHAMBER SPARK PLUG

FIELD OF THE INVENTION

This invention pertains to pre-chamber spark plugs, and more particularly to pre-chamber spark plugs for lean burn engines.

BACKGROUND OF THE INVENTION

Engines operating on gaseous fuels, such as natural gas, are commonly supplied with a lean fuel mixture, which is a mixture of air and fuel containing a relatively high ratio of air to fuel. The lean fuel mixture often results in misfires, detonation, incomplete combustion and poor fuel economy. One factor that can lead to such events is the poor ability of conventional spark plugs to effectively ignite a lean fuel mixture in the cylinder of the operating engine. More effective combustion of lean fuel mixtures can be achieved using a precombustion chamber.

Pre-chamber (i.e., precombustion chamber) spark plugs are used in the precombustion chamber and are typically used to enhance the lean flammability limits in lean burn engines such as natural gas lean burn engines. In known pre-chamber spark plugs such as the pre-chamber spark plug disclosed in U.S. Pat. No. 5,554,908, the spark gap is confined in a cavity having a volume that is typically less than three percent of the engine cylinder displacement. The top portion of the cavity is shaped as a dome and has various tangential induction/ejection ports. During operation, as the engine piston moves upward during the compression cycle, air/fuel is forced through the induction ports in the pre-chamber. The orientation of the ports creates a swirling motion inside the pre-chamber cavity.

The difference in density between the air and the fuel in conjunction with the swirl motion causes fuel stratification within the pre-chamber cavity. With proper location of the spark gap, effective ignition can be achieved in a fuel rich area. The fast burning of fuel in the pre-chamber cavity can result in highly penetrating jets of flames into the engine combustion chamber. These jets of flames provide the ability to achieve a more rapid and repeatable flame propagation in the engine combustion chamber at leaner air/fuel mixtures.

One problem that the prior art does not address is spark plug operation with ultra-lean air/fuel mixtures (lambda>1.75) and high BMEP (Brake Mean Effective Pressure) (>18 bars). At such operating conditions, the spark plug life tends to be very short. As a result, commercialization of high efficiency and high power density gas engines is not practical.

What is not described in the prior art are the attributes and configurations required for the pre-chamber cavity, the induction/ejection ports, the shape and location of electrodes that minimize electrode erosion and maximize spark plug life, especially with ultra-lean air/fuel mixtures and high BMEP. The prior art also does not address the issue of water condensation inside the spark plug pre-chamber and in between the electrodes causing short circuit and plug misfire. Additionally, the prior art does not address the issue of plug surfaces overheating and causing preignition.

The invention provides such attributes and configurations for engines operating with ultra-lean air/fuel mixtures and high BMEP. These and other advantages of the invention, as well as additional inventive features, will be apparent from the description of the invention provided herein.

BRIEF SUMMARY OF THE INVENTION

The invention provides a method and apparatus to maximize spark plug life in pre-chamber spark plugs operating with ultra-lean mixtures and/or at elevated engine BMEP. Electrode erosion is reduced by spreading the discharge energy per electrode unit surface area over a wider area, maintaining fuel concentration in the spark gap, controlling gas static pressure at the time of electrical discharge, and maintaining electrode temperature within its safe operating range.

The discharge energy is spread over a larger surface area by creating a swirling pattern in the air/fuel mixture. In one embodiment, the swirling pattern is achieved with periphery holes in the spark plug end cap that are drilled at an angle in the end cap. The swirling effect results in a lower specific energy discharge at the electrodes by generating a flow field force acting upon the spark discharge and causing the arc to move, thereby reducing the electrode erosion rate.

The spark plug electrodes are arranged in a variable configuration by shaping the ground electrode and/or the center electrode such that a variable size spark gap is created. The variable size spark gap results in a reduction of the spark voltage required for ignition at high operating pressures, thereby reducing the energy required for ignition. The variable configuration also results in reliable ignition in engines operating at lean air/fuel ratios due to the minimum gap of the variable sized spark gap effectively concentrating fuel in a small gap.

The center electrode of the pre-chamber spark plug protrudes into the pre-chamber cavity. As a result, the center electrode is exposed to the combustion of the air/fuel mixture in the pre-chamber cavity and the resulting increase in temperature. The ceramic insulation for the center electrode is designed to provide an effective heat transfer path to prevent overheating of the center electrode, which may cause preignition.

The volume behind the ground electrode provides a volume for burnt products from previous combustion cycles and provides a more reliable ignition especially with very lean air/fuel mixtures. This volume allows the burnt products to be pushed backwards when the air/fuel mixture for another combustion cycle is drawn into the pre-combustion chamber. This volume is sized such that effective ignition is achieved with very lean air/fuel mixtures. In one embodiment, the ratio between the volume behind the spark gap and the spark plug pre-chamber volume is greater than the ratio between the engine combustion chamber volume and the engine displacement.

Other aspects, objectives and advantages of the invention will become more apparent from the following detailed description when taken in conjunction with the accompanying drawings.

BRIEF DESCRIPTION OF THE DRAWINGS

FIG. 5b is a cross-sectional view of the end-cap of FIG. 5a;

FIG. 7 is a cross-sectional view of the ground electrode of FIG. 6a with the induction ports of FIGS. 5a, 5b superimposed on the ground electrode;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a method and apparatus to maximize spark plug life in pre-chamber spark plugs operating with ultra-lean mixtures and at elevated engine BMEP. The key factors affecting electrode erosion include discharge energy per electrode unit surface area, fuel concentration in the spark gap, gas static pressure at the time of electrical discharge, and electrode temperature.

Figure 1:
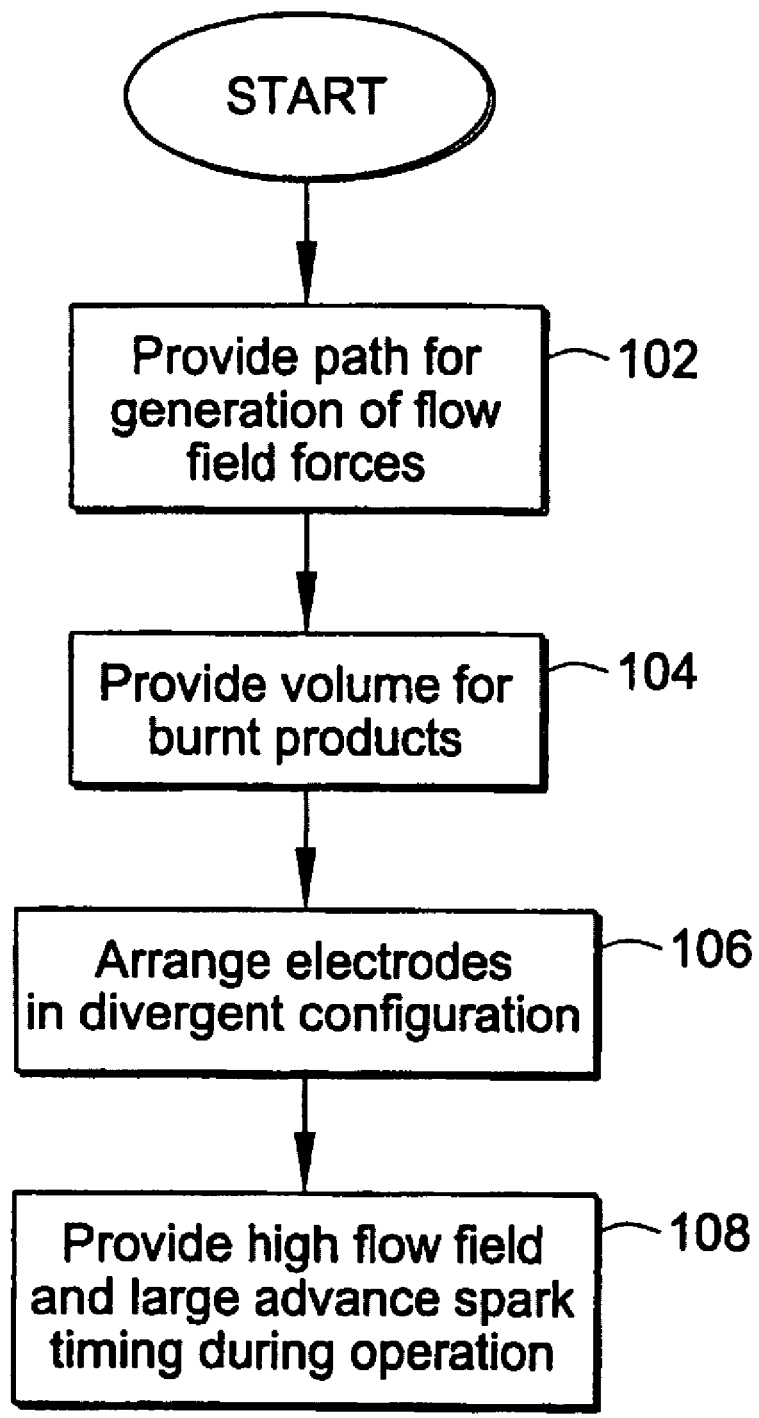
FIG. 1 is a flow chart illustrating the overall steps taken to maximize spark plug life in pre-chamber spark plugs in accordance with the teachings of the present invention.

FIG. 1 shows the overall steps to maximize spark plug life in pre-chamber spark plugs operating with ultra-lean mixtures and at elevated engine BMEP. A brief description of the overall steps shall first be presented. As used herein, ultra-lean mixture refers to an excess-air factor lambda ($\lambda$) of at least 1.75 where $\lambda$ is related to the air-fuel ratio according to the equation $$\lambda = \frac{\text{Actual air/fuel ratio}}{\text{Stochiometric air/fuel ratio}}$$

The excess-air factor $\lambda$ indicates the amount that the air/fuel ratio is above or below a stoichiometric mixture.

Turning now to FIG. 1, one step 102 to maximize the spark plug life is to provide a path for the generation of flow field forces. The flow field forces act upon the spark discharge and cause the arc generated during operation to move. As a result, the spark energy is distributed onto a larger electrode surface resulting in a lower specific energy discharged per unit of surface. With a lower specific energy discharged at the electrodes, a reduced electrode erosion rate is achieved. Flow fields on the order of 30 m/sec may be needed for some operating conditions.

Another step 104 to maximize the spark plug life is to provide enough volume, below the electrode gap area, to contain the burnt products from the previous cycle during operation. The volume in one embodiment is greater than the spark plug pre-chamber volume times the cylinder volumetric ratio. This feature allows effective ignition even with very lean air/fuel mixtures. Coincident with this step or separate from this step should be the optimization (e.g., minimization) of the heat transfer path to prevent electrode overheating.

A further step 106 to maximize the spark plug life is to arrange the electrodes in a variable configuration such that there is a minimum gap in the order of 0.005 to 0.010 inches and a maximum gap in the order of 0.03 to 0.05 inches. The variable size gap is effective in reducing the spark breakdown voltage requirements at high BMEP and also allow reliable ignition at lean air/fuel ratios.

A further step 108 to maximize the spark plug life is to provide a flow field at the time of ignition that is suitable to concentrate a richer air/fuel mixture in the vicinity of the spark gap. The flow field characteristics are driven by the engine spark timing and the configuration of the induction/ejection ports of the pre-chamber spark plug. High flow fields in the order of 5-30 m/s and large advance spark timing in the order of 20-40 crank angles before top dead center are preferable because the static pressure at the gap is reduced, and therefore, spark breakdown voltage requirements are reduced.

Figure 2:
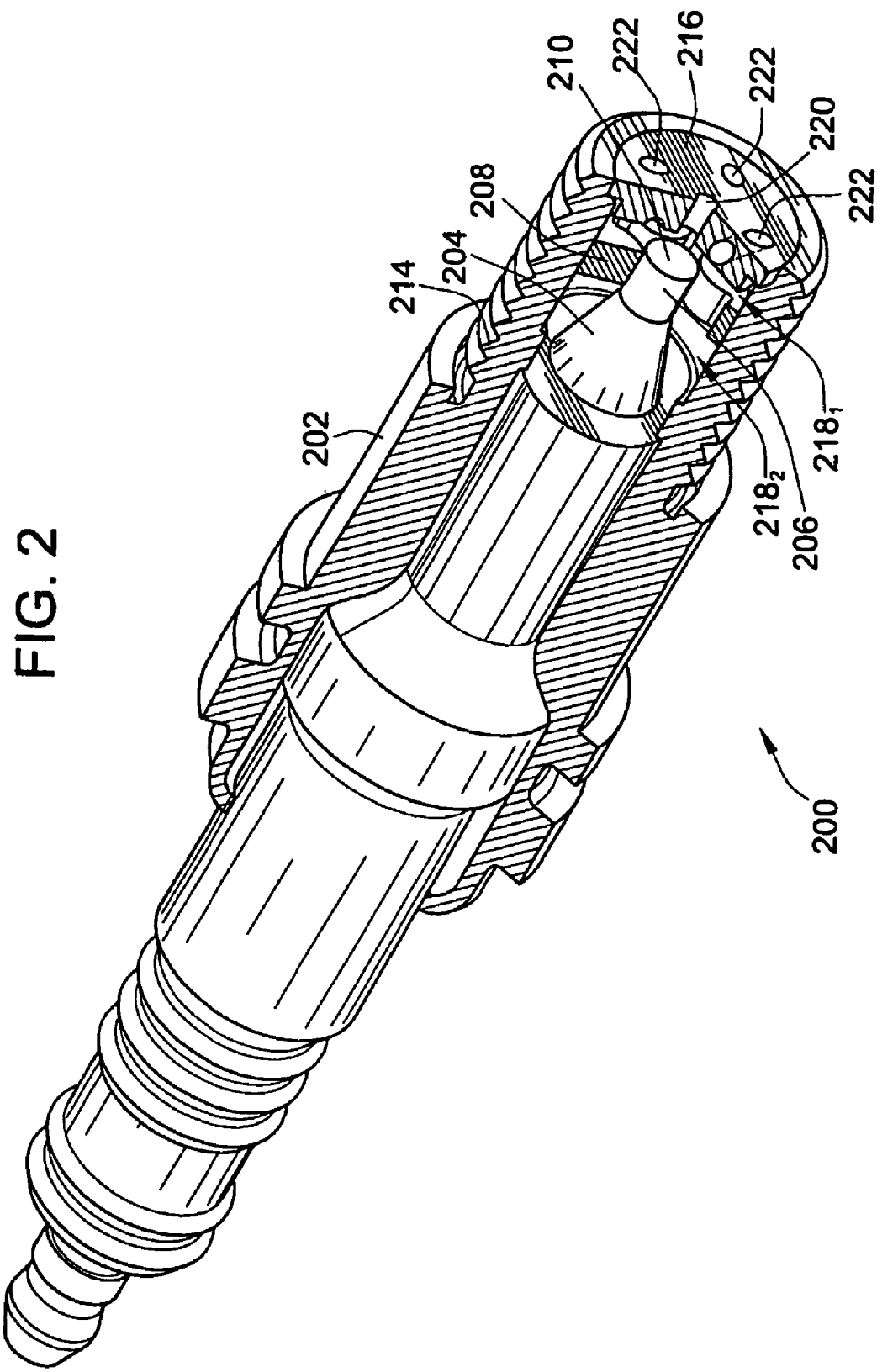
FIG. 2 is an isometric view of a pre-chamber spark plug in accordance with the teachings of the present invention.
Figure 3:
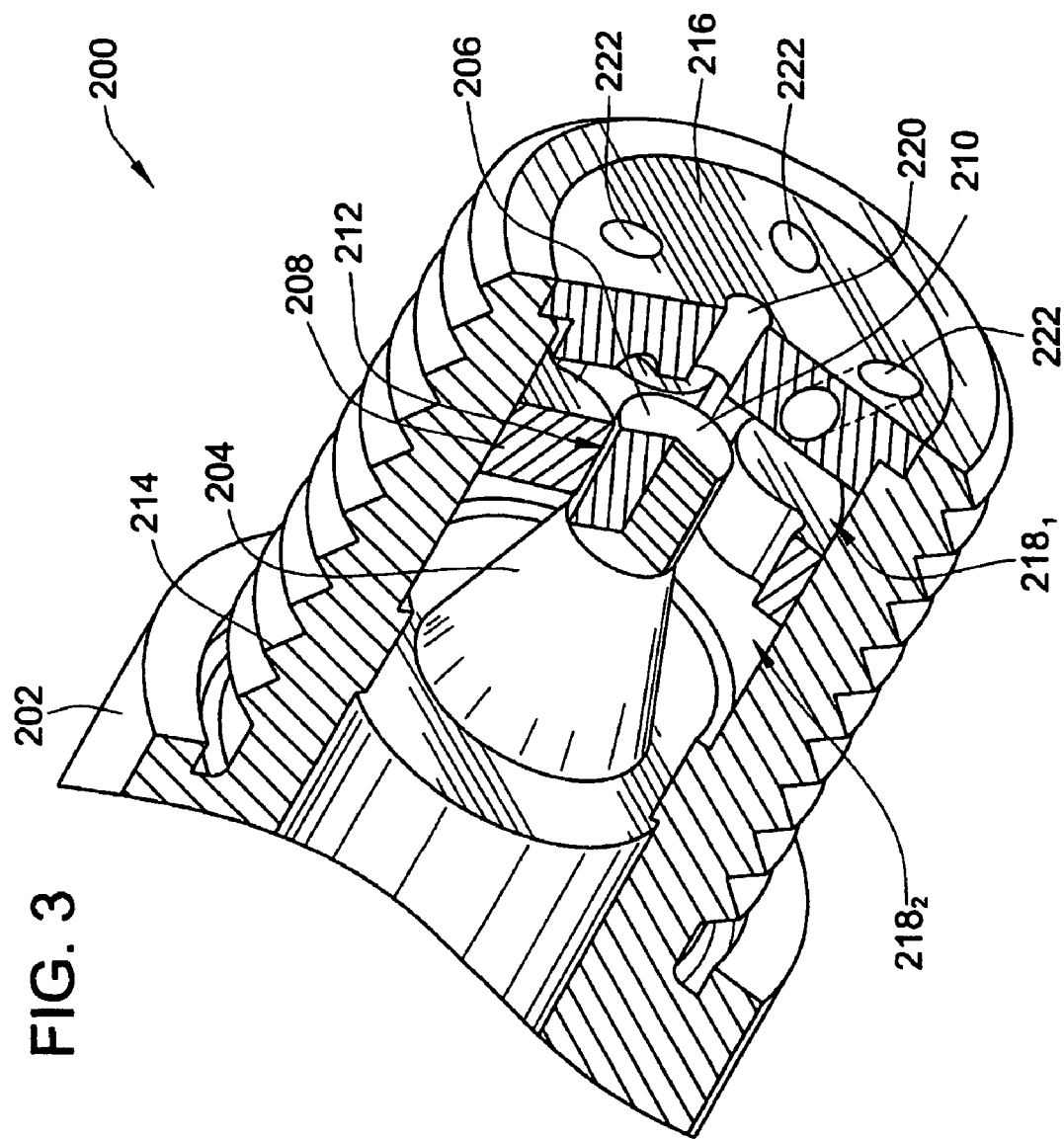
FIG. 3 is an enlarged view of the pre-chamber spark plug of FIG. 2.
Figure 4:
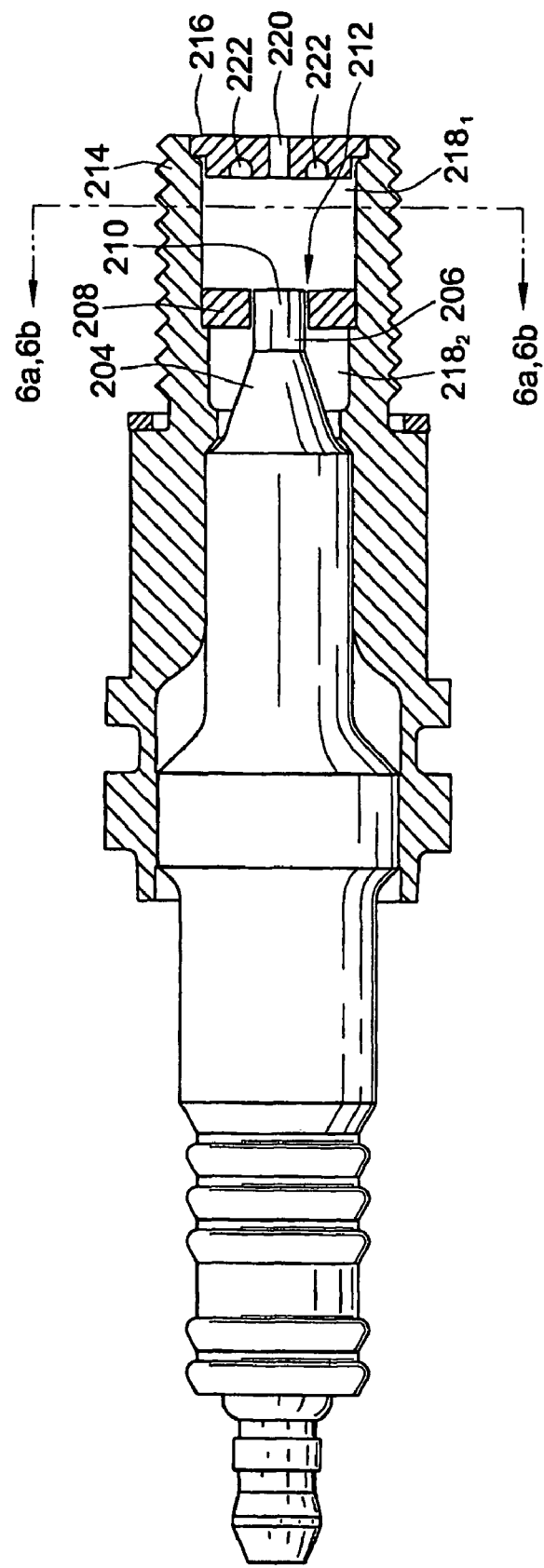
FIG. 4 is a partial cross-sectional view of the pre-chamber spark plug of FIG. 2.

Turning now to FIGS. 2-4, an embodiment of a pre-chamber spark plug 200 that incorporates the structures associated with the steps of FIG. 1 is shown. Spark plugs are known in the art, so a detailed description of the conventional portions of the pre-chamber spark plug 200 need not be described in detail herein. The spark plug 200 includes a cylindrical shell 202 and an insulator that is fitted into the shell 202 such that a tip portion 204 projects from the shell 202. The shell 202 is typically formed from metallic material such as low-carbon steel. A center electrode 206 is disposed inside the insulator such that a portion at the tip portion 204 projects from the insulator. The tip portion is used to provide a heat transfer path from the center electrode 206 during combustion of the air/fuel mixture in the pre-chamber spark plug 200.

In a conventional spark plug, a ground electrode is used wherein one end is joined to the shell through, for example, welding and whose opposite end is bent laterally such that a side face thereof faces a tip portion of the center electrode 206. Unlike a conventional spark plug, the ground electrode 208 of the present invention is disc-like shaped and is mounted proximate the end 210 of the center electrode 206. A variable size spark gap 212 is formed between the ground electrode 208 and the center electrode 206. The location of the ground electrode 208 depends upon the engine volumetric ratio. The engine volumetric ratio is the ratio of the total cylinder volume to the main combustion chamber volume. In one embodiment, the location of the ground electrode 208 in the precombustion chamber is selected such that the ratio of the total precombustion chamber volume to the volume behind the ground electrode 208 (i.e., the volume opposite the end cap 214) is less than the engine volumetric ratio. In equation form, this is written as:

$$\frac{V_p}{V_g} < \frac{V_t}{V_c}$$

where $V_p$ is the total precombustion chamber volume ($218_1$ + $218_2$), $V_g$ is the residual volume ($218_2$) behind the ground electrode 208, $V_t$ is the total cylinder volume (i.e., the volume displaced by the piston), and $V_c$ is the volume of the combustion chamber (i.e., the volume of the cylinder having the air/fuel mixture). For example, assume $V_t/V_c$ is on the order of 10 in magnitude, then the ratio of $V_p$ to $V_g$ should be less than 10. The volume behind the ground electrode 208 provides a volume for residual combustion products that have not exited the precombustion chamber (during a previous combustion cycle). The residual combustion products dilute the air/fuel mixture during intake of the air/fuel mixture into the precombustion chamber.

Note that the spark plug temperature is a function of total precombustion chamber volume. The plug temperature typically increases (i.e., becomes hotter) with an increase in volume due principally to the larger mass of fuel being burned in the chamber. As the temperature increases, the likelihood of pre-ignition occurs. However, the combustion performance generally improves with an increase in volume because there is an increase in hot gases to inject in the orifices, which results into more penetration into the main combustion chamber and a bigger plume that enhances combustion. As a result, the actual ratio of $V_p$ to $V_g$ used is based on engine characteristics and desired performance. For example, in one engine, a $V_p/V_g$ of 5 may work better than a $V_p/V_g$ of 3 while in another engine, a $V_p/V_g$ of 3 works better than a $V_p/V_g$ of 5.

Unlike a conventional spark plug, the shell 202 extends beyond the end 210 of the ground electrode 206. A threaded portion 214 is formed on the outer circumferential surface of the shell 202 and adapted to mount the plug 200 onto an engine block such that a portion of the shell 202 extends into the pre-combustion chamber of the engine (not shown).

Figure 5B:
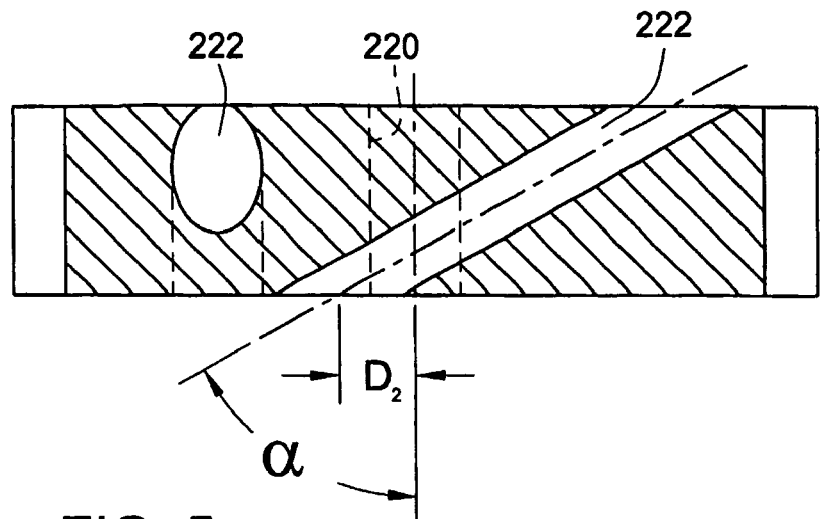
Figure 5A:
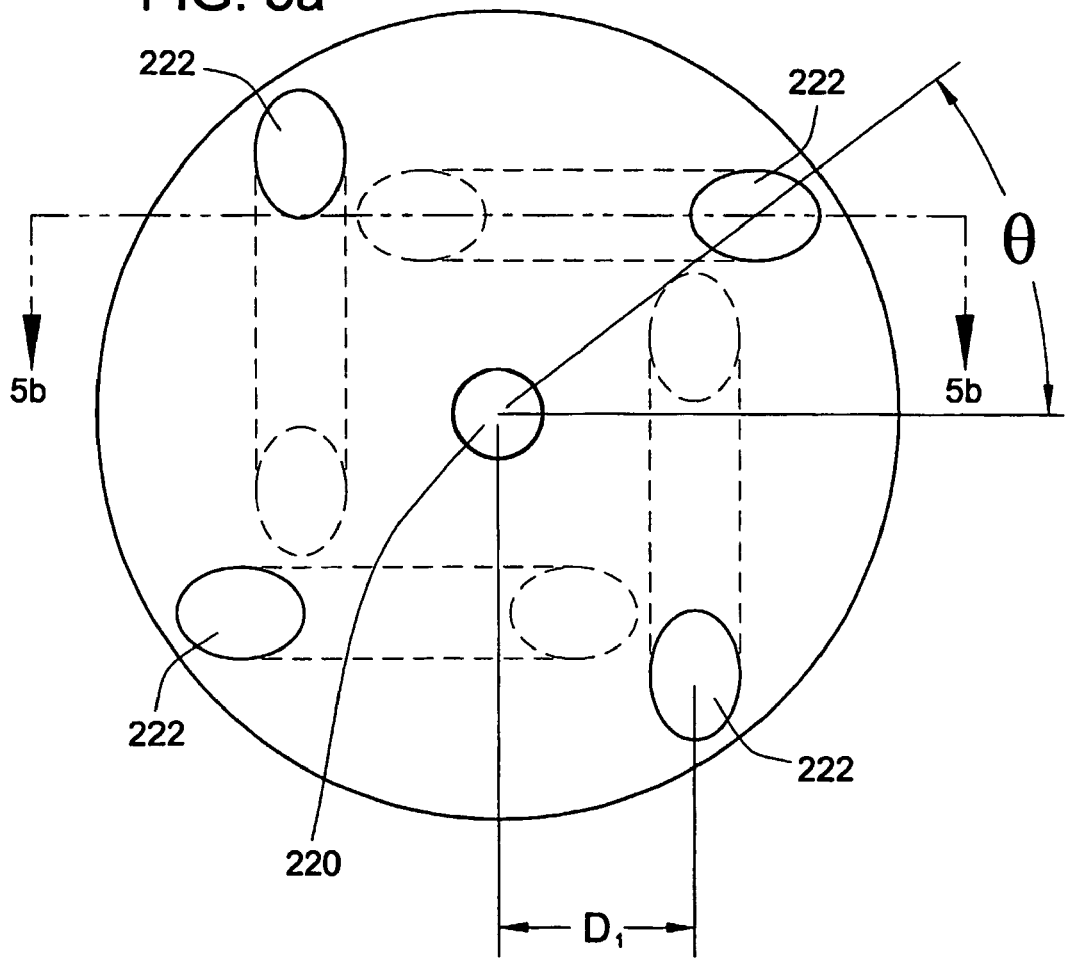
FIG. 5a is a front view of an end-cap of the pre-chamber spark plug of FIG. 2 illustrating induction ports in accordance with the teachings of the present invention.

An end cap (swirler) 216 encloses the shell 202, resulting in a prechamber cavity 218. The prechamber cavity 218 consists of an ignitable volume $218_1$ in front of the electrode 208 and a residual volume $218_2$ behind the electrode 208. Turning now to FIGS. 5a and 5b, the end cap 214 contains drilled holes 220, 222 for entrance of fresh charges of air/fuel and discharge of combustion products during operation. The hole area and effective flow coefficient is sized to insure optimum "breathing" efficiency. For example, the hole area should be big enough to allow filling of the prechamber cavity 218 during subsonic piston motion (e.g., piston is moving through top dead center) while small enough to provide a sonic velocity of discharging gas (i.e., the plume). In one embodiment, the configuration of the end cap (swirler) that maximizes heat transfer and minimizes likelihood of pre-ignition is "flush" with the cylinder head. Depending on combustion chamber configuration and cylinder head design, a slightly protruding swirler can be effectively constructed (see FIG. 12).

The center hole 220 is typically straight (i.e., parallel to the center line of the spark plug 200). The periphery holes 222 are angled to create a swirl pattern in the discharging gas. The swirl of the gas/fuel mixture causes the arc generated during operation to move such that the energy in the arc is dissipated over a larger surface of the ground electrode 208 and center electrode 206, thereby lowering the temperature of the ground electrode 208 and center electrode 206. The angles $\theta$, $\alpha$ and distances $d_1$ and $d_2$ are selected based upon the engine characteristics such as the speed of the piston stroke. The periphery holes 222 are sized in one embodiment to choke the flow in the periphery holes during discharge (i.e., ignition in the main chamber) so that the main flow (i.e., discharge of hot gases) occurs through center hole 220 while providing sufficient flow during intake of gases to the cavity 218 to provide a swirling effect to help ignite the gases in the precombustion chamber. The swirling effect improves combustion stability, and with proper sizing, it does not produce excessive flow restriction. The angled holes 222 result in the generation of flow field force acting upon the spark discharge as described below. In one embodiment, the diameter of the angled holes 222 is 0.060 inches and the diameter of the center hole 220 is 0.065 inches. The high flow velocity at the spark gap also provides an additional benefit of sweeping away any water condensed during engine shut-down.

Figure 6A:
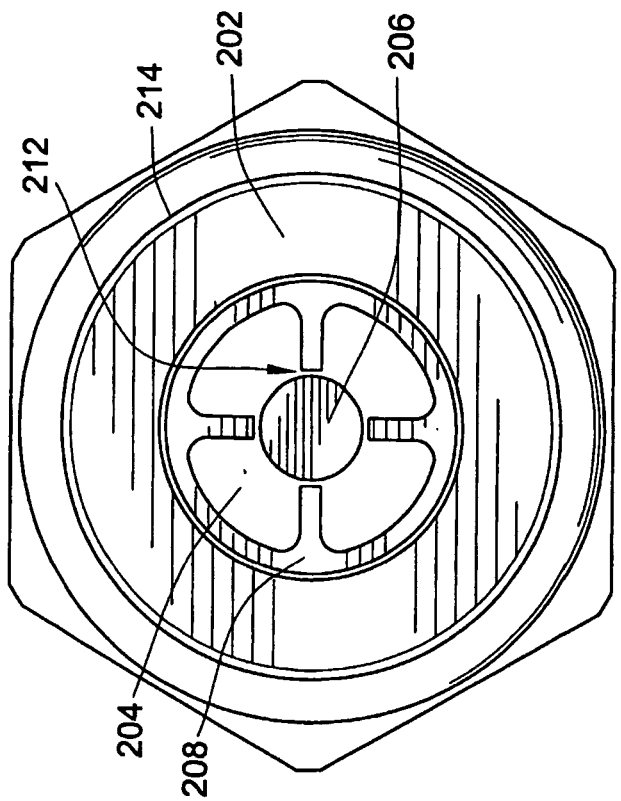
FIG. 6a is a cross-sectional view of an embodiment of a ground electrode having a divergent electrode configuration in accordance with the teachings of the present invention along line 6a,6b-6a, 6b of FIG. 4.
Figure 6B:
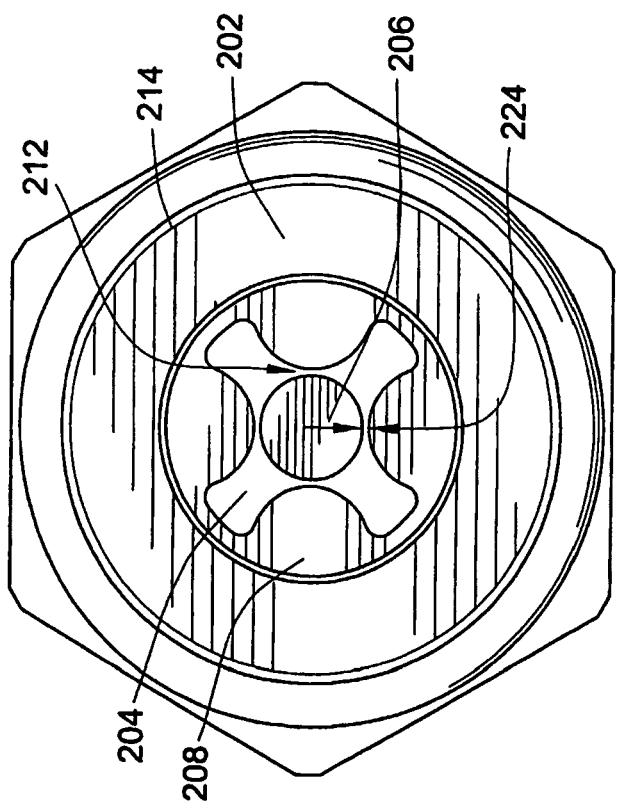
FIG. 6B is a cross-sectional view of an alternate embodiment of a ground electrode having a divergent electrode configuration in accordance with the teachings of the present invention along line 6a,6b-6a, 6b of FIG. 4

Turning now to FIGS. 6a, and 6b, the shape of the electrode 208 is shaped to be divergent with respect to the center electrode 206. The divergence of the electrode 208 results in elongation of the arc discharge and a variable size spark gap 212. For example, in FIG. 6a, the ground electrode has a lobed shape such that the spark gap 212 is concave with respect to center electrode 206. It can be seen that the spark gap 212 has a minimum gap size at location 224 and the spark gap 212 diverges on each side of the minimum gap. In one embodiment, the size of the gap ranges from a minimum gap in the order of 0.005 to 0.010 inches for operation with a high BMEP and a maximum gap in the order of 0.030 to 0.050 inches. Note that the minimum gap could be lower, but present manufacturing tolerances limit how low the gap can be without costly manufacturing techniques. A gap of 0.005 is high enough where manufacturing tolerances are minimal. The variable size gap 212 is effective in reducing spark voltage requirements (i.e., the drive voltage) at high pressures. Additionally, the variable size provides more reliable ignition during operation with lean air/fuel ratio conditions. FIG. 6b shows an alternate implementation of a variable spark gap 212.

Figure 8:
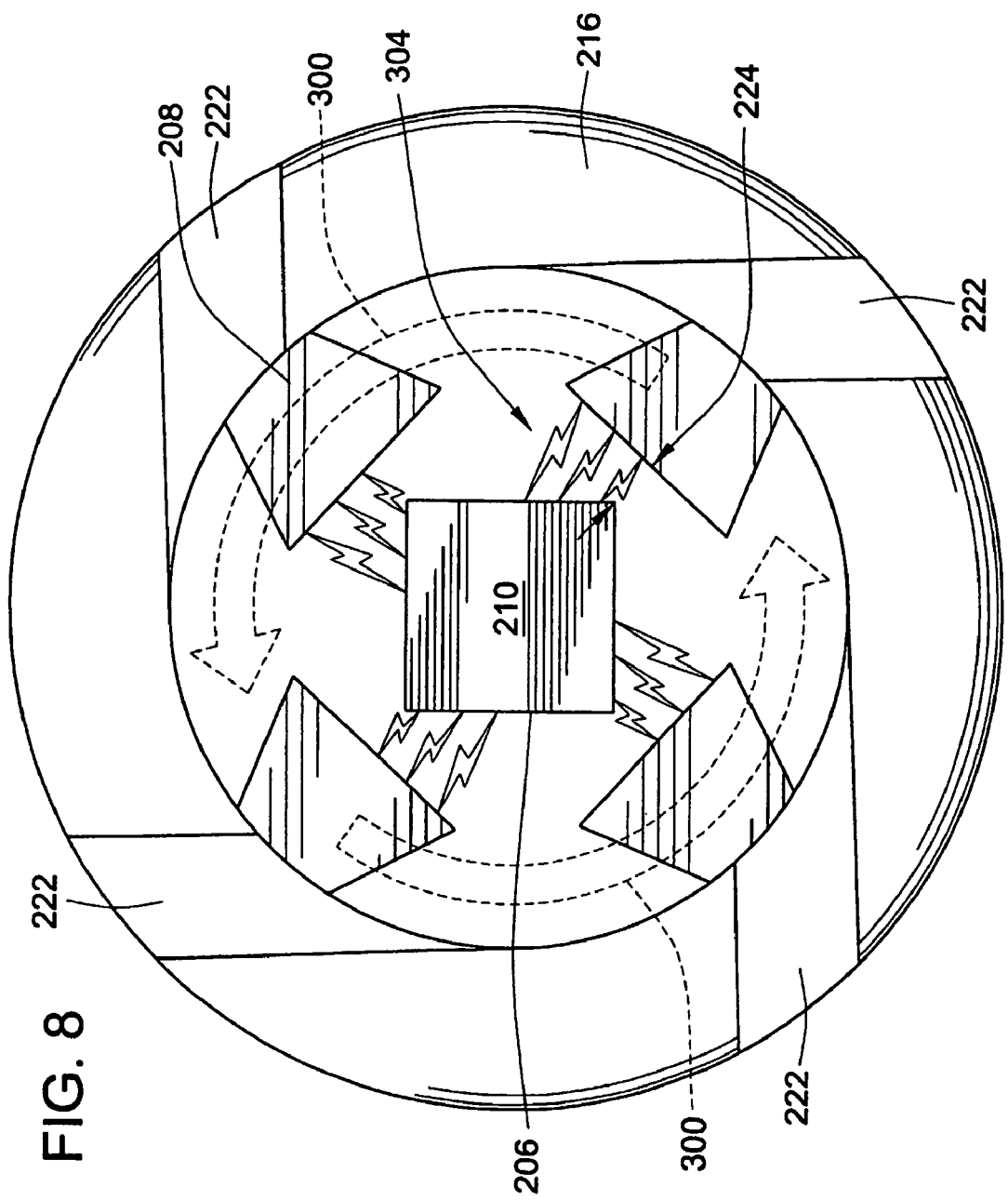
FIG. 8 is a cross-sectional view of an alternate embodiment of a ground electrode with the induction ports of FIGS. 5a, 5b superimposed on the ground electrode.

As previously indicated the present invention generates flow field forces acting upon the spark discharge and causes the arc to move and distribute the spark energy onto a much larger surface area. This can be seen in FIG. 7, which illustrates the periphery holes 222 of end cap 216 superimposed on the ground electrode 208. An illustration of flow field forces represented by arrows 300 acting upon the arc 302 is shown. Without the flow field forces, the arc would be concentrated at the minimum gap location 224. With the flow field forces, the arc moves and the energy associated with the arc is distributed to a larger area as indicated by reference number 304. As shown in FIG. 7, the configuration of the induction/ejection ports 222 results in the flow field moving primarily in the direction of arrows 300. With a different configuration, the flow field can move in other directions. The configuration of the induction/ejection ports 222 should be such that the flow field at the time of ignition concentrates a richer air/fuel mixture in the vicinity of the spark gap 212 to enhance operation. Note that in addition to the configuration of the induction/ejection ports 222, the flow field characteristics are also dictated by engine spark timing. High flow fields in the order of 5-30 m/s and large advance spark timing in the order of 20-40 crank angles before top dead center reduce the static pressure at the spark gap 212, which results in a reduction of the drive voltage requirement of the spark voltage. FIG. 8 illustrates another embodiment of a ground electrode 208 with flow fields acting upon the arc. Note that the center electrode 206 is rectangular instead of circular and the ground electrode 208 is tooth shaped (i.e., is trapezoidal shaped).

Figure 9:
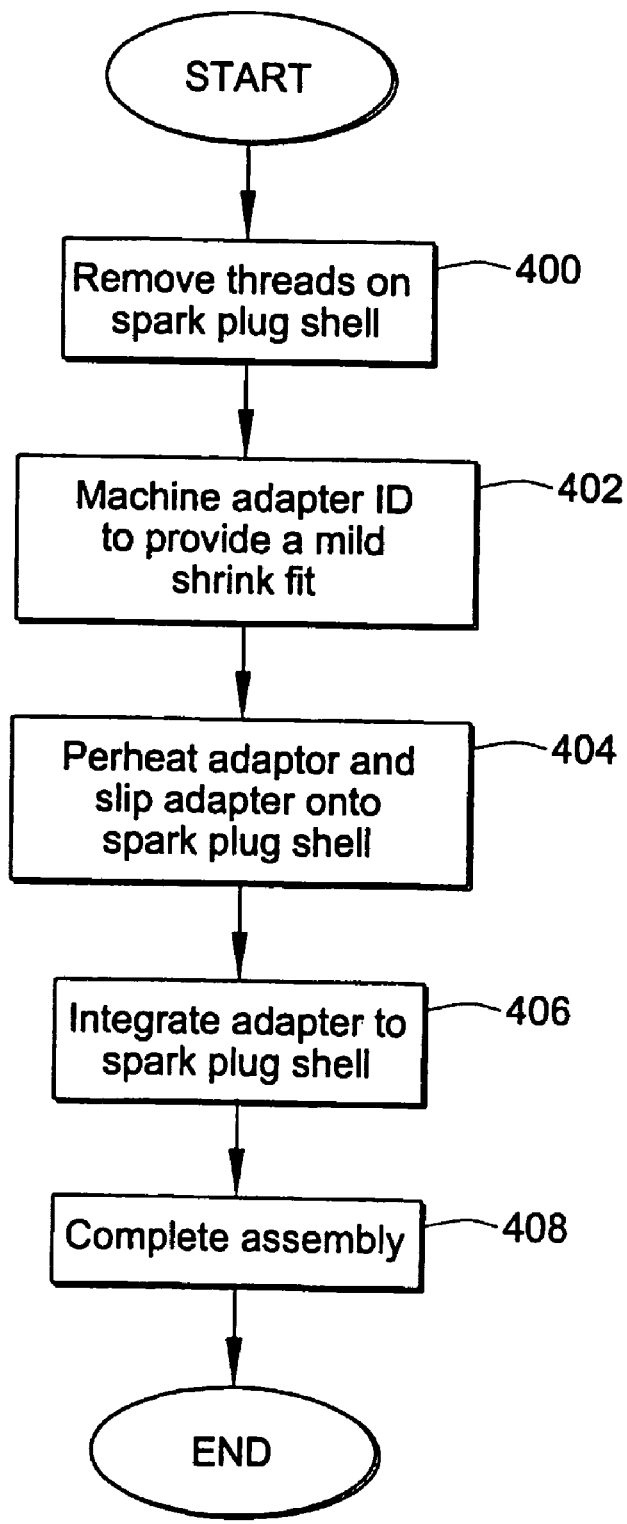
FIG. 9 is a flow chart illustrating the steps of manufacturing a pre-chamber spark plug from a standard spark plug using an adapter.
Figure 10:
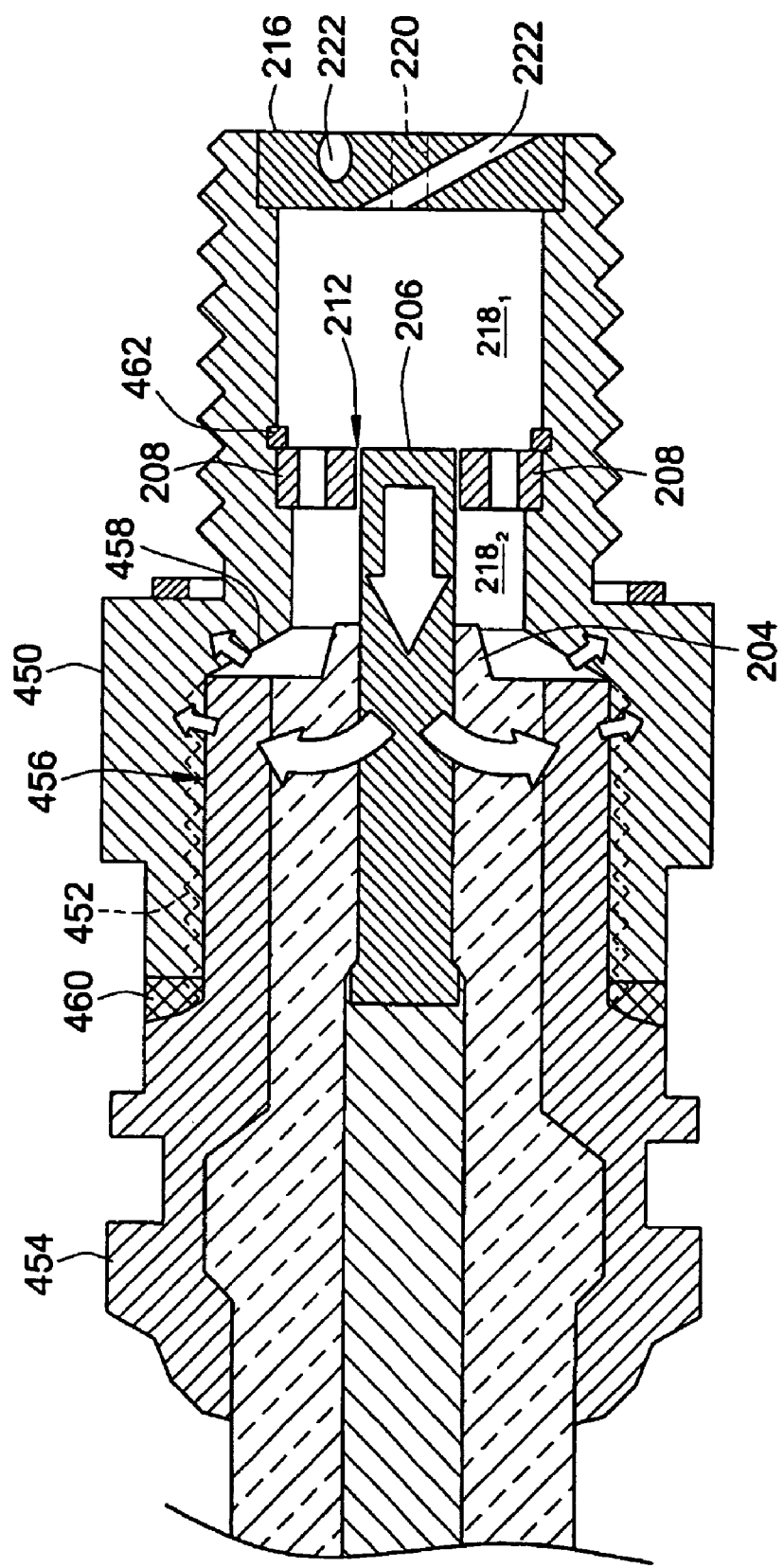
FIG. 10 is a cross-sectional view of a standard spark plug modified with an adapter to create a pre-chamber spark plug.
Figure 11:
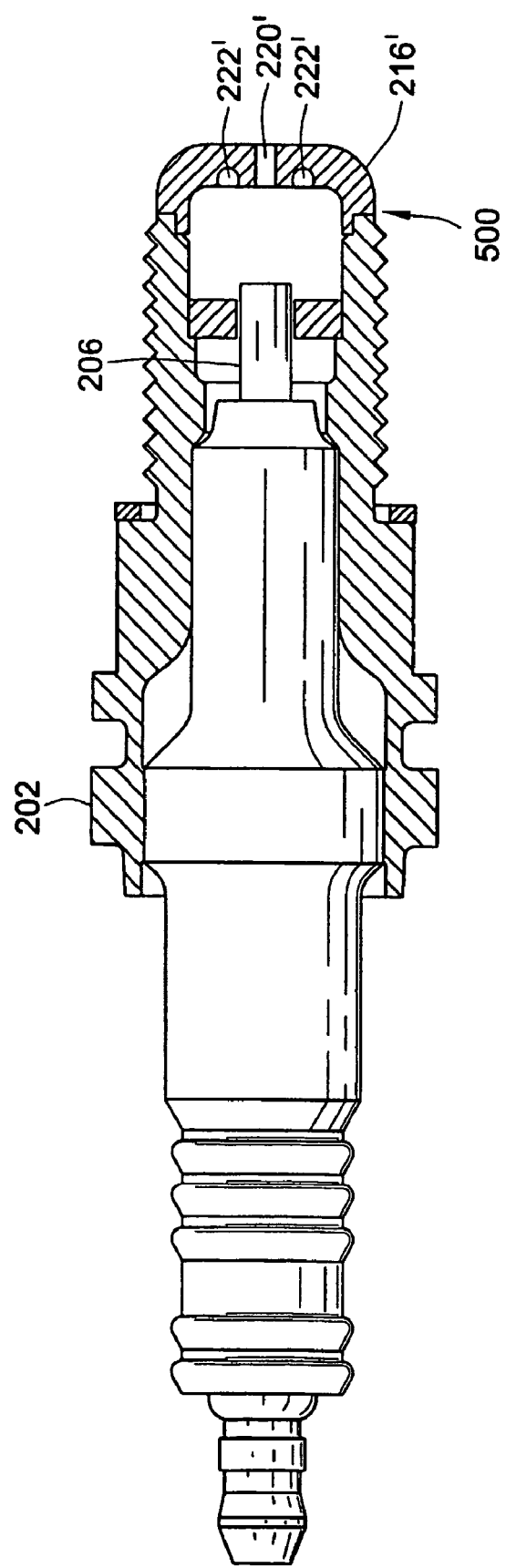
FIG. 11 is a cross-sectional view of a pre-chamber spark plug with a slightly protruding end-cap.

In the above description, the pre-chamber spark plug was described in terms of a one-piece shell construction (see FIG. 2). The shell may also take the form of a multi-piece shell construction. For example, a standard spark plug can be converted to a pre-chamber spark plug by adding an adapter to the existing shell of the standard spark plug to create the pre-chamber spark plug shell. Turning now to FIGS. 9-10, in one embodiment, a prechamber spark plug can be manufactured from a standard spark plug using an adapter 450. The adapter 450 is sized to fit ground electrode 208, end cap 216 and provide prechamber cavity 218 with $V_p/V_g$ as described above. The threads 452 on the spark plug shell 454 are removed via grinding or other operation (step 400). The inner diameter of adapter 450 is machined such that surface 464 provides a mild shrink fit with respect to shell 454 where the threads 452 have been removed (step 402). In one embodiment, the shrink fit is on the order of approximately 0.002 inches. The adapter is pre-heated and slipped onto the spark plug shell 454 (step 404). A fixture should be used to hold the spark plug shell 454 to the adapter 450 to ensure there is adequate contact for the heat transfer path from the center electrode 206 to the adapter 450 as indicated by the arrows (see FIG. 10). The primary heat transfer path is from the center electrode 206, through insulator 204, out the tapered seat 458, and into the cylinder head (not shown) via a gasket such as a copper gasket. The heat transfer path provides a path for the center electrode heat due to ignition of the air/fuel mixture in the pre-combustion cavity 218 and is important for a long spark plug life and resistance to pre-ignition. The adapter 450 is integrated with the spark plug shell 454 via welding (as indicated by reference 460) and the like (step 406). The welding process is typically done using Gas Tungsten Arc Welding (GTAW), which is frequently referred to as TIG welding, or other types of welding. Other techniques such as brazing may be used provided the technique is capable of withstanding approximately 2500 psi at 350 degrees Celsius.

After the adapter 450 is integrated, the adapter assembly is completed (step 408). The completion includes mounting ground electrode 208 in the cavity 218 and mounting end cap 216. Note that the center electrode end 210 may need to be machined if the end 210 is to be flush with the ground electrode 208. In one embodiment, the ground electrode 208 is held against an internal step with one or more seals or gaskets 462. The ground electrode 208 may also be held in place with seals or gaskets on both sides of the ground electrode 208. Alternatively, the inner diameter of the adapter 450 may be threaded and the ground electrode held in place with threads. While the end cap 216 is shown fitting within the adapter 450 (or the shell 202), it is noted that the end cap 216 may fit over the adapter 450 (or shell 202) or be flush with the outer diameter of the adapter 450 (or shell 202).

As previously described, a slightly protruding swirler can be constructed depending on combustion chamber configuration and cylinder head design. Turning now to FIG. 12, in an alternate embodiment, a swirler 216' that is slightly protruding from the end of the shell 202 (or adapter 450) is shown. The swirler 216' has a center hole 220' and periphery holes 222' as described above with respect to swirler 216. The swirler 216' is attached to the shell 202 via welding, brazing, and the like.

From the foregoing, it can be seen that a method and apparatus to maximize spark plug life in pre-chamber spark plugs operating with ultra-lean mixtures and at elevated engine BMEP has been described. The key factors affecting electrode erosion include discharge energy per electrode unit surface area, fuel concentration in the spark gap, gas static pressure at the time of electrical discharge, and electrode temperature. The discharge energy has been spread across a larger surface area via the swirling effect created by the periphery holes in the end cap. The swirling effect results in a lower specific energy discharge at the electrodes, which reduces the electrode erosion rate. Furthermore the high flow field obtained at the divergent electrode gap assures that any water condensation is swept away before the electrical discharge occurs. The divergent configuration of the electrodes resulting from the shape of the ground electrode and/or the center electrode reduces the spark voltage at high operating pressures, thereby reducing the energy required for ignition, while providing reliable ignition at lean air/fuel ratios. The design of the ceramic insulation for the center electrode provides an effective heat transfer path to prevent overheating of the center electrode. The volume behind the ground electrode provides a volume for burnt products from previous combustion cycles and provides a more reliable ignition with very lean air/fuel mixtures.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to extend the life of a pre-chamber spark plug comprising the step of generating non-magnetic flow field forces acting upon spark discharge of the pre-chamber spark plug with sufficient force to cause an ignition arc to move, thereby distributing spark energy onto a larger electrode surface.

2. The method of claim 1 further comprising the step of arranging one or more electrodes in a divergent configuration.

3. The method of claim 1 further comprising the step of providing a volume behind an electrode gap for burnt products from at least one previous ignition cycle.

4. The method of claim 1 further comprising the step of providing a path to generate the non-magnetic flow field forces.

5. The method of claim 4 wherein the step of providing a path to generate the non-magnetic flow field forces comprises the step of providing at least one angled path in an end cap of the pre-chamber spark plug.

6. The method of claim 5 wherein the step of generating the non-magnetic flow field forces comprises the step of forcing an air and fuel mixture through the at least one angled path.

7. The method of claim 5 wherein the divergent configuration and angled path are sized such that condensed water between the one or more electrodes is swept away by the non-magnetic flow field forces.

8. A method to extend the life of a pre-chamber spark plug comprising the steps of:
arranging electrodes of the pre-chamber spark plug in a divergent configuration; and
generating non-magnetic flow field forces acting upon spark discharge of the pre-chamber spark plug with sufficient force to cause an ignition arc to move, thereby distributing spark energy onto a larger electrode surface.

9. The method of claim 8 further comprising the step of providing a volume to contain burnt products from at least one previous ignition cycle.

10. The method of claim 8 wherein the step of arranging the electrodes includes the step of arranging the electrodes such that a minimum spark gap has a size in the range of 0.005 to 0.010 inches.

11. The method of claim 10 wherein the step of arranging the electrodes further includes the step of arranging the electrodes such that a maximum spark gap has a size in the range of 0.03 to 0.05 inches.

12. The method of claim 8 wherein the step of arranging the electrodes includes providing a lobed shaped electrode.

13. A method to extend the life of a pre-chamber spark plug comprising the step of providing a volume for burnt products from at least one previous ignition cycle; further comprising the step of generating non-magnetic flow field forces acting upon spark discharge of the pre-chamber spark plug with sufficient force to cause the ignition arc to move, thereby distributing spark energy onto a larger electrode surface.

14. The method of claim 13 wherein the step of providing a volume for burnt products from at least one previous ignition cycle comprises the step of providing a volume behind an electrode gap for the burnt product.

15. The method of claim 14 wherein the pre-chamber spark plug has ceramic insulation between a center electrode and a shell of the pre-chamber spark plug and wherein the step of providing a volume for burnt products includes the step of configuring the ceramic insulation such that electrode overheating is minimized and a desired volume is provided.

16. The method of claim 13 wherein the step of providing a volume includes the step of providing a volume according to the equation:

$$\text{Volume} > \frac{V_{prechamber}}{V_{ratio}}$$

where $V_{prechamber}$ is the total volume of the pre-chamber volume of the pre-chamber spark plug and $V_{ratio}$ is an engine volumetric ratio.

17. The method of claim 13 further comprising the step of arranging electrodes in a divergent configuration.

18. A method to extend the life of a pre-chamber spark plug comprising the step of:
generating non-magnetic flow field forces acting upon spark discharge of the pre-chamber spark plug with sufficient force to cause the ignition arc to move, thereby distributing spark energy onto a larger electrode surface;
arranging electrodes in a divergent configuration; and
providing a volume behind a gap of the electrodes for burnt products from at least one previous ignition cycle.

19. The method of claim 18 wherein the step of providing a volume comprises the step of providing a volume that minimizes a heat transfer path and prevents overheating of at least one of the electrodes.

20. The method of claim 18 wherein the step of arranging the electrodes includes the step of arranging the electrodes such that a minimum spark gap has a size in the range of 0.005 to 0.010 inches.

21. The method of claim 20 wherein the step of arranging the electrodes further includes the step of arranging the electrodes such that a maximum spark gap has a size in the range of 0.03 to 0.05 inches.

22. The method of claim 18 wherein the step of arranging the electrodes includes providing a lobed shaped electrode.

23. The method of claim 18 further comprising the step of providing a path to generate the flow field forces.

24. The method of claim 23 wherein the step of providing a path to generate the flow field forces comprises the step of providing at least one angled path in an end cap of the pre-chamber spark plug.

25. The method of claim 24 wherein the step of generating the flow field forces comprises the step of forcing an air and fuel mixture through the at least one angled path.

* * * * *

UNITED STATES PATENT AND TRADEMARK OFFICE
CERTIFICATE OF CORRECTION

PATENT NO. : 7,659,655 B2  Page 1 of 1
APPLICATION NO. : 10/547623
DATED : February 9, 2010
INVENTOR(S) : Tozzi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Thirtieth Day of November, 2010

David J. Kappos
*Director of the United States Patent and Trademark Office*